March 1, 1932. A. A. PONSONBY 1,847,443
STORAGE BATTERY LOCOMOTIVE
Filed Feb. 11, 1930 2 Sheets-Sheet 1

INVENTOR
Amos A. Ponsonby.
BY
ATTORNEY

March 1, 1932.   A. A. PONSONBY   1,847,443
STORAGE BATTERY LOCOMOTIVE
Filed Feb. 11, 1930    2 Sheets-Sheet 2
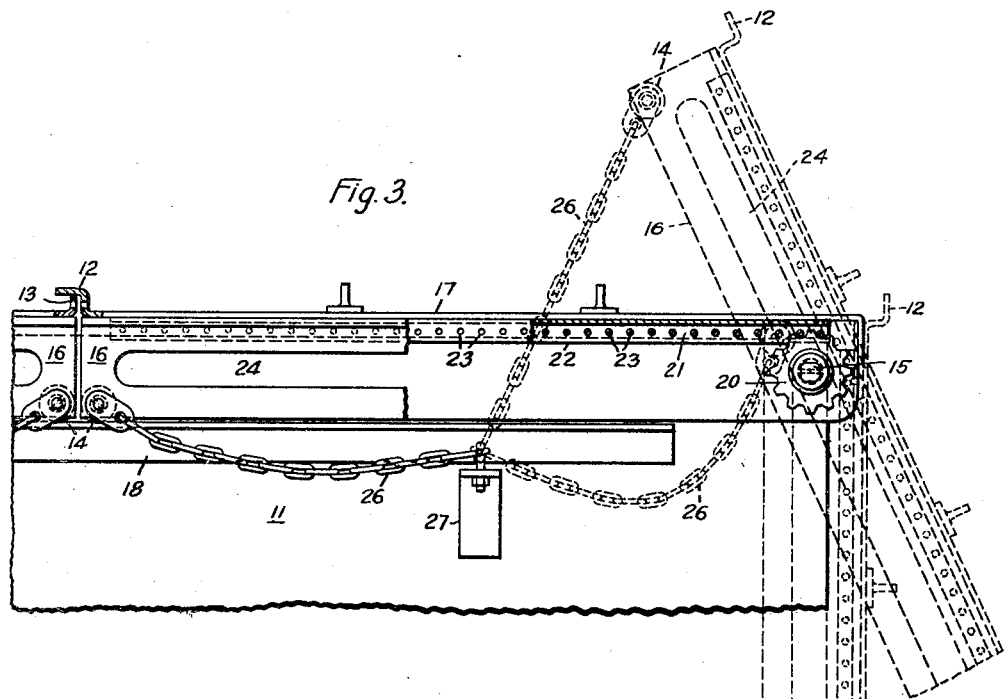
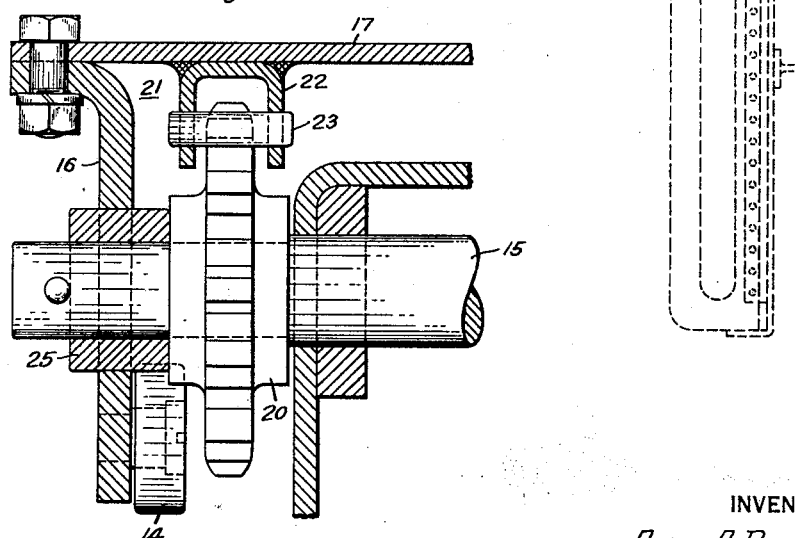
INVENTOR
Amos A. Ponsonby
BY
Charles G. Carr
ATTORNEY Patented Mar. 1, 1932

1,847,443

UNITED STATES PATENT OFFICE

AMOS A. PONSONBY, OF FOREST HILLS, PENNSYLVANIA, ASSIGNOR TO WESTINGHOUSE ELECTRIC & MANUFACTURING COMPANY, A CORPORATION OF PENNSYLVANIA

STORAGE BATTERY LOCOMOTIVE

Application filed February 11, 1930. Serial No. 427,465.

My invention relates to electric vehicles and particularly to electric locomotives of the storage-battery type.

An object of my invention, generally stated, is to provide a storage-battery locomotive that shall be efficient in operation and may be readily and economically manufactured.

A more specific object of my invention is to provide for removing and replacing the battery-crate cover of a storage-battery locomotive by mechanical means.

According to my invention, the battery-crate cover of a storage-battery locomotive is divided in two sections and each section is disposed to be removed or replaced by the operation of a mechanical device, such as the crank-actuated means which is disclosed in this embodiment of the invention.

For a full understanding of the nature and objects of the invention, reference should be had to the following detailed description, taken in conjunction with the accompanying drawings, in which;

Fig. 3 is an end view of a portion of a crate and its cover, partially in elevation and partially in section, showing details of the construction and Fig. 4 is a sectional view, showing details of the sprocket-and-rack assembly.

Figure 1:
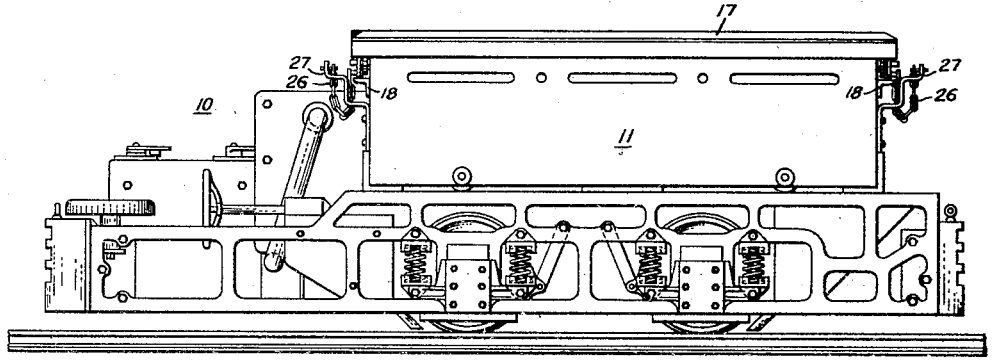
Fig. 1 is a view, in side elevation, of a storage-battery locomotive having a removable battery-crate cover constructed in accordance with my invention.

Referring to the drawings, the apparatus shown in Fig. 1 comprises a locomotive 10, of the storage-battery type. Since the locomotive may be of any standard construction, it will not be described in detail in this specification.

As is the usual practice, the batteries provided for supplying power for operating a locomotive are carried in a receptacle 11 mounted on the frame of the locomotive. In order that the batteries may be accessible for inspection and recharging, removable covers are provided for the battery crates.

In this instance, in order to facilitate operation, the cover is constructed in two sections. A weather-proof joint is provided between the two sections, which comprises a flange 12 (Fig. 3) on the one section that overlaps a flange 13 on the other section.

In the interest of simplicity of disclosure, the description and drawings will be confined to the details of construction of only one cover section. The other section is similar in structure and is mounted and operated in the same manner.

Figure 2:
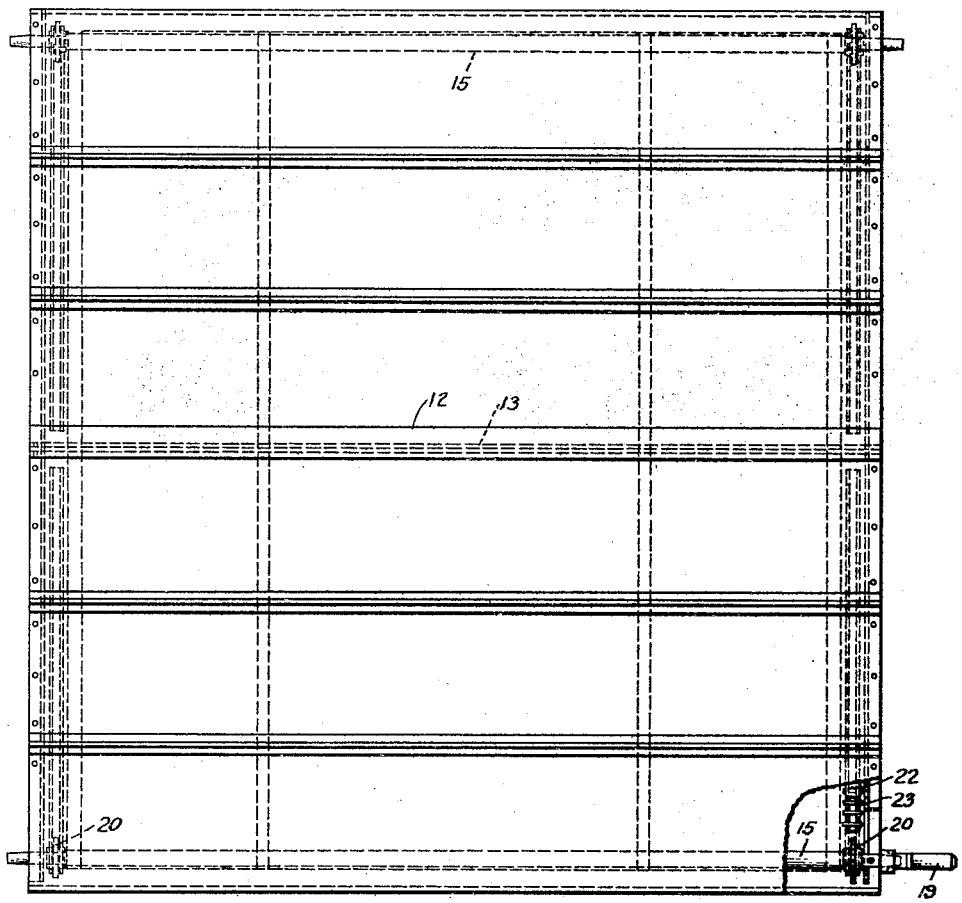
Fig. 2 is a top plan view of the battery-crate cover, a portion being cut away.

In order that the cover section may be removed without being lifted by hand or by a crane, it is provided with rollers 14 that are mounted on brackets 16, attached to a top plate 17 of the cover section to roll on angle-iron tracks 18 with which the body portion of the battery crate 11 is provided. A shaft 15 is rotatably mounted on the crate 11 and, as shown in Fig. 2, extends its entire length. As shown in Fig. 2, each end of the shaft is adapted to receive a removable crank 19, which may be turned by an operator to remove the cover section, as will be explained hereinafter.

It will be observed that a sprocket wheel 20 is mounted on the shaft 15 near each of its ends. The sprocket wheels 20 are in fixed relation to the shaft 15 to be rotated when the shaft is rotated by means of the crank 19.

In order that the cover may be moved transversely to the receptacle 11, the teeth of the sprocket wheels 20 engage racks 21. The racks comprise channel irons 22, of U shape, welded to the top plate 17 of the cover, and present downwardly extending flanges. A plurality of pins 23 are mounted in openings provided in the channel-iron flanges to be engaged by the teeth of the sprocket wheels 20.

As shown in Fig. 3, the brackets 16 are provided with slots 24 to be utilized as guides for the cover section and as means for holding the sprockets 20 in mesh with the racks 21 and also to limit the movement of the cover section.

In order to reduce friction between the shaft 15 and the bracket 16, the former is provided with sleeves 25, as shown in Fig. 4. Since the weight of the cover section is supported by the sleeves 25 and the rollers 14, the cover section may be easily moved across the top of the crate by rotating the shaft 15.

It will be observed that a chain 26 is interposed between the cover section and the crate 11 to limit the movement of the section. As shown in Fig. 3, one end of the chain 26 is attached to the crate 11 by a bracket 27 while its other end is connected to the end of bracket 16 of the cover section. As illustrated in Fig. 3, the chain 26 prevents the cover section from overswinging about the edge of the crate and striking its side when it becomes unbalanced, as it is being lowered into position at that side. When the cover is being raised from the side of the crate, the chain gradually draws it toward a horizontal position.

From the foregoing description, it will be seen that either cover section may be readily removed or replaced by rotating its shaft 15, in the proper direction, by means of the crank 19. When a section is being removed, it is first moved in a horizontal plane transversely of the receptacle 11. As the center of gravity of the cover section passes the shaft 15, mounted at the edge of the crate 11, the cover section becomes unbalanced and swings to an inclined position, as illustrated in Fig. 3, when it may be gradually lowered to a position parallel to the side of the crate by opposing the force of gravity by means of the crank 19. The cover section may be replaced by reversing the foregoing operation, the section being first moved in a vertical plane by means of the sprocket and rack and finally moved to a horizontal plane on top of the crate.

Since certain changes may be made in the above-described construction, and different embodiments of the invention may be made without departing from the scope thereof, it is intended that all matter contained in the above description, or shown in the accompanying drawings, shall be interpreted as illustrative and not in a limiting sense.

I claim as my invention:

1. In a receptacle, in combination, a cover section for the receptacle, means for moving the cover section in a horizontal plane transversely of the receptacle, whereby it becomes unbalanced and rotates about an edge of the receptacle to a position parallel to one side thereof, means permitting the cover section to be moved in a vertical plane and flexible means interposed between the receptacle and cover section to limit the movement of the latter, said means being disposed to cooperate with the cover section moving means to provide for drawing the section into a horizontal position on the receptacle.

2. In a receptacle, in combination, a cover section for the receptacle, a shaft supported by the frame of the receptacle and disposed to be rotated by a crank, a rack attached to the cover section, a sprocket wheel attached to said shaft and disposed to engage the rack to move the cover section transversely of the receptacle, whereby it becomes unbalanced and rotates about an edge of the receptacle to a position parallel to one side thereof, a bracket attached to the cover section and containing a guide slot for controlling the position thereof, and a chain interposed between the receptacle and the cover section to limit the movement of the latter.

3. In a storage-battery locomotive provided with a battery crate for containing a battery, in combination, a sectional cover for the battery crate, means adapted to be operated by a crank for mechanically removing or replacing each section of the cover independently, means for controlling the position of each section of the cover as it is being removed or replaced, means constituting a weather-proof joint between the sections when they are in position to cover the battery crate, and flexible means interposed between each section of the cover and the crate for limiting the movement of the cover section, whereby each cover section may be moved in a horizontal plane and in a vertical plane.

4. In a cover for receptacles, in combination, a cover section, means for moving the cover section transversely of the receptacle until the weight of the cover section extending beyond the receptacle causes it to tilt, means for limiting the tilting movement of the cover section, said moving means cooperating with the limiting means to control the movement of the cover section after it reaches the tilted position until it reaches a position parallel to the side of the receptacle, and means permitting the cover section to move in a vertical plane to a position in which the edge of the cover is substantially even with the top of the receptacle.

5. In combination, a cover section, a supporting frame for the cover section, means for moving the cover section in a horizontal plane transversely of the frame to cause it to tilt and move in a vertical plane into a position at the side of the frame, means interposed between the supporting frame and the cover section to limit the tilting movement of the section, said means being disposed to cooperate with the cover-section moving means to provide for drawing the section into position on the supporting frame, and grooved means cooperating with the moving means to limit the vertical movement of the cover section.

6. In a receptacle, in combination, a cover section for the receptacle, a shaft supported by the frame of the receptacle, means for rotating the shaft, a rack attached to the cover section, a sprocket wheel rotated by said shaft and disposed to engage the rack to move the cover section transversely of the receptacle, means attached to the cover section and cooperating with the shaft to control the position of the cover section, and means interposed between the receptacle and the cover section to limit the movement of the latter, whereby the cover section may be moved to a position parallel to one side of the receptacle.

7. In a receptacle, in combination, a cover section for the receptacle, a shaft supported by the frame of the receptacle and disposed to be rotated by a crank, a rack attached to the cover section, a sprocket wheel attached to the shaft and disposed to engage the rack to move the cover section transversely of the receptacle, a bracket attached to the cover section and containing a guide slot for controlling the position thereof, a track disposed to support the cover section when it is in position on the receptacle, an anti-friction member on the cover section disposed to roll on the track, and flexible means interposed between the receptacle and the cover section to limit the movement of the latter, whereby the cover section may be moved to a position parallel to one side of the receptacle.

8. In a receptacle, in combination, a cover section for the receptacle, a shaft supported by the frame of the receptacle and disposed to be rotated by a crank, a rack attached to the cover section, a sprocket wheel attached to the shaft and disposed to engage the rack to move the cover section transversely of the receptacle, a bracket attached to the cover section and containing a guide slot disposed to cooperate with the shaft to maintain the rack teeth in engagement with the sprocket wheel, an anti-friction member interposed between the shaft and the bracket, a track disposed to support the cover section when it is in a horizontal position on the receptacle, an anti-friction member on the cover section disposed to roll on the track, and a chain interposed between the receptacle and the cover section to limit the movement of the latter, whereby the cover section may be moved from a horizontal position on the receptacle to a vertical position at the side of the receptacle.

9. In a receptacle, in combination, a cover section for the receptacle, rack teeth attached to the cover section, a gear wheel disposed to engage the rack teeth, means for rotating the gear wheel to move the cover section in a horizontal plane transversely of the receptacle until it tilts about the edge of the receptacle, means interposed between the receptacle and the cover section to limit the tilting movement of the latter, and guide means attached to the cover section and cooperating with the shaft to permit the cover section to be moved in a vertical plane, whereby the cover section may be moved from a position on top of the receptacle to a position parallel to one side of the receptacle.

In testimony whereof, I have hereunto subscribed my name this 21st day of January, 1930.

AMOS A. PONSONBY.